US012619508B2

(12) United States Patent     (10) Patent No.:     US 12,619,508 B2
Yuan et al.     (45) Date of Patent:     May 5, 2026

(54) METHOD OF TESTING EXPANSION CARD, ELECTRONIC DEVICE, AND TESTING SYSTEM

(71) Applicant: Fulian Precision Electronics (Tianjin) Co., LTD., Tianjin (CN)

(72) Inventors: Jie Yuan, Tianjin (CN); Xin Chen, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 18/828,808

(22) Filed: Sep. 9, 2024

(65) Prior Publication Data

US 2025/0328440 A1     Oct. 23, 2025

(30) Foreign Application Priority Data

Apr. 17, 2024     (CN) .......................... 202410465520.3

(51) Int. Cl.
*G06F 11/22*          (2006.01)
(52) U.S. Cl.
CPC ................................ *G06F 11/2221* (2013.01)
(58) Field of Classification Search
CPC .................................................... G06F 11/2221
See application file for complete search history.

(56) References Cited

U.S. PATENT DOCUMENTS

| | | | | |
|---|---|---|---|---|
| 5,815,722 A | * | 9/1998 | Kalwitz | .................. H04L 67/34 |
| | | | | 709/200 |
| 6,167,534 A | * | 12/2000 | Straathof | ............ G06F 11/3414 |
| | | | | 714/E11.193 |
| 6,572,384 B1 | * | 6/2003 | Marchevsky | ......... G06F 13/409 |
| | | | | 439/43 |
| 10,261,880 B1 | * | 4/2019 | Levin | ...................... G06F 21/00 |
| 10,678,721 B1 | * | 6/2020 | BeSerra | ................ G06F 13/102 |
| 2004/0088604 A1 | * | 5/2004 | Bland | ................... G06F 11/221 |
| | | | | 714/E11.161 |
| 2005/0086421 A1 | * | 4/2005 | Nassar | .................. G06F 3/0626 |
| | | | | 711/103 |
| 2006/0107118 A1 | * | 5/2006 | Alperin | ................... G06F 11/24 |
| | | | | 714/E11.154 |
| 2007/0174730 A1 | * | 7/2007 | Tolmie | .................. G06F 21/552 |
| | | | | 714/45 |

(Continued)

FOREIGN PATENT DOCUMENTS

| | | |
|---|---|---|
| CN | 109739716 A | 5/2019 |
| CN | 111541589 A | 8/2020 |

(Continued)

*Primary Examiner* — Ashish Thomas
*Assistant Examiner* — Indranil Chowdhury
(74) *Attorney, Agent, or Firm* — ScienBiziP, P.C.

(57)          ABSTRACT

A method of testing an expansion card includes configuring a configuration file according to contents of instructions of a controller, which may be received by the expansion card, and contents of expected data corresponding to the instructions. Testing instructions are generated based on the configuration file. The testing instructions are sent to the expansion card. Returned data returned from a firmware of the expansion card by responding the testing instructions. Whether an electronic device communicates with the expansion card successfully is determined based on the returned data. An electronic device and a testing system are also provided.

17 Claims, 5 Drawing Sheets

(56)          References Cited

U.S. PATENT DOCUMENTS

| | | | | |
|---|---|---|---|---|
| 2008/0091859 A1* | 4/2008 | Chan | G06F 11/2289 | |
| | | | | 714/E11.15 |
| 2009/0112548 A1* | 4/2009 | Conner | G06F 11/261 | |
| | | | | 714/25 |
| 2009/0113245 A1* | 4/2009 | Conner | G06F 11/2733 | |
| | | | | 714/39 |
| 2013/0227177 A1* | 8/2013 | Cho | G06F 11/3051 | |
| | | | | 710/16 |
| 2014/0236527 A1* | 8/2014 | Chan | G01R 31/318307 | |
| | | | | 702/119 |
| 2014/0237292 A1* | 8/2014 | Chan | G06F 11/2733 | |
| | | | | 714/32 |
| 2015/0316611 A1* | 11/2015 | Petrov | G01R 31/3177 | |
| | | | | 714/724 |
| 2017/0090896 A1* | 3/2017 | Lin | G06F 8/61 | |
| 2017/0315857 A1* | 11/2017 | Mosteller | G06F 11/0772 | |
| 2019/0079776 A1* | 3/2019 | Okayasu | G06F 9/4401 | |
| 2019/0227894 A1* | 7/2019 | Shih | G06F 11/2273 | |
| 2020/0364132 A1* | 11/2020 | Underseth | G06F 11/3698 | |

FOREIGN PATENT DOCUMENTS

| | | | | |
|---|---|---|---|---|
| WO | WO-02061588 A1 * | 8/2002 | | G06F 13/409 |
| WO | WO-2019071530 A1 * | 4/2019 | | G06F 11/26 |

* cited by examiner

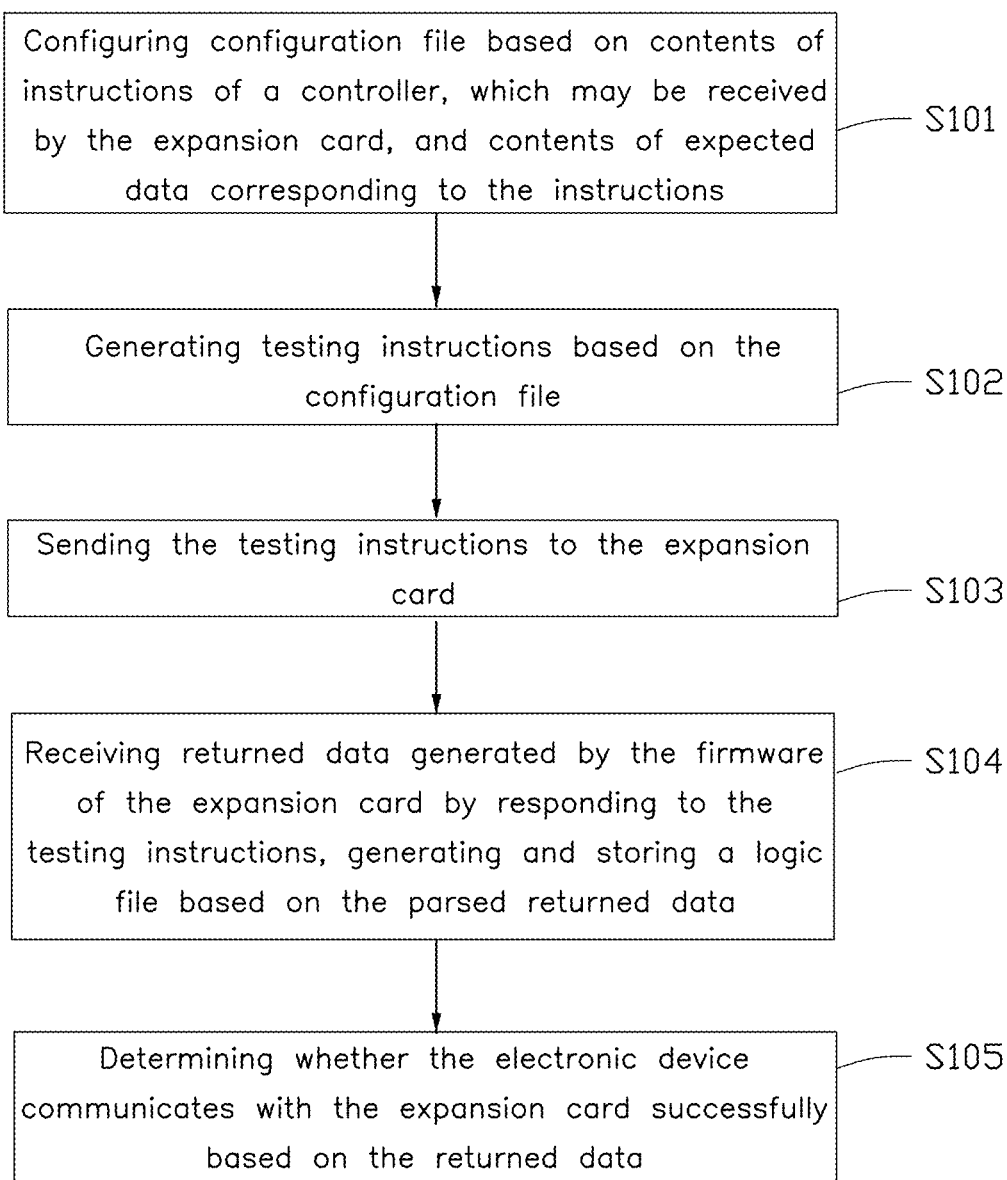

Configuring configuration file based on contents of instructions of a controller, which may be received by the expansion card, and contents of expected data corresponding to the instructions — S101

Generating testing instructions based on the configuration file — S102

Sending the testing instructions to the expansion card — S103

Receiving returned data generated by the firmware of the expansion card by responding to the testing instructions, generating and storing a logic file based on the parsed returned data — S104

Determining whether the electronic device communicates with the expansion card successfully based on the returned data — S105

FIG. 2

Configuration file

Sending part: Sending parameters
Receiving part: Receiving parameters

FIG. 3

METHOD OF TESTING EXPANSION CARD, ELECTRONIC DEVICE, AND TESTING SYSTEM

TECHNICAL FIELD

The present application generally relates to server technology, and particularly to a method of testing expansion card, an electronic device, and a testing system.

BACKGROUND

A server includes an expansion card and a baseboard management controller (BMC). Each of the expansion card and the BMC includes firmware. While the firmware in the expansion card and the BMC is initially completed. For ensuring the accuracy of the firmware, the firmware in the expansion card and the BMC need to be executed for testing the accuracy of the firmware in the expansion card and/or the BMC. During developing the firmware in the expansion card and the BMC, a correctness of each firmware in the expansion card and the BMC is low, thus multiple tests are needed, which takes time and manpower. The developments of the firmware in the expansion card and the BMC are not synchronized with each other, a joint test is unable to be executed in time, and the developing process of each firmware in the expansion card and the BMC affects. Besides, there are two developing teams for the firmware of the expansion card and the BMC, the joint test is executed by the two developing teams. While executing the joint test, communication and collaborations between the two developing teams are not smooth, the joint test is unable to execute successfully, and data situation is unable to reflect clearly, which takes the manpower in the two developing teams and delays a process of developing the firmware of the expansion card and the BMC.

Thus, before testing the accuracy of the firmware, whether the expansion card may communicate with the BMC needs to be test firstly.

There is room for improvement in the art.

BRIEF DESCRIPTION OF THE DRAWINGS

Implementations of the present application will now be described, by way of example only, with reference to the attached figures.

FIG. 2 is a flowchart illustrating a first embodiment of a method of testing an expansion card according to the present application.

FIG. 3 is a diagram illustrating an embodiment of an application scenario of the testing system of FIG. 2 according to the present application.

DETAILED DESCRIPTION

Figure 1:
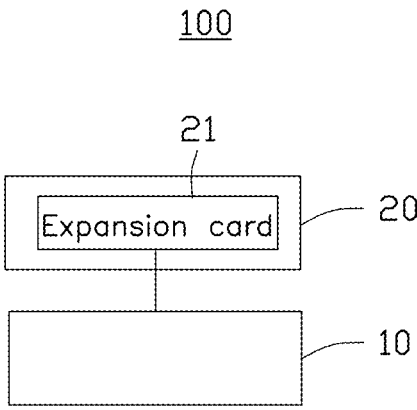
FIG. 1 is a diagram illustrating an embodiment of a testing system according to the present application.

The technical solutions in the embodiments of the present application will be clearly and completely described below which combine with reference to the accompanying drawings in the embodiments of the present application. Apparently, the described embodiments are some of the embodiments of the present application rather than all of the embodiments. Based on the embodiments of the present application, it is understandable to a person skilled in the art, any other embodiments obtained by persons skilled in the art without creative effort shall all fall into the scope of the present application. It will be understood that the specific embodiments described herein are merely some embodiments and not all.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The application is illustrated by way of example and not by way of limitation in the figures of the accompanying drawings in which like references indicate similar elements. It should be noted that references to "an" or "one" embodiment in this application are not necessarily to the same embodiment, and such references can mean "at least one."

It should be understood that, the connection relationship described in this application, indicates a direct or indirect connection. For example, connecting between A and B may be a direct connection between A and B, or may be indirect connection between A and B by using one or more other electronic components. For example, A is directly connected to C, and C is directly connected to B, so that A is connected to B by using C.

In the description of the present application, unless other specified, "/" means "or", for example, "A/B" may mean "A" or "B". The term "and/or" is used to describe an association relationship for describing associated objects, and indicates that three relationships may exist. For example, "A and/or B" may represent the following three cases: Only A exists, only B exists, and both A and B exist, where A and B may be singular or plural.

In the description of the present application, terms "first", "second", and the like used in the specification, the claims, and the accompanying drawings of the present application are used to distinguish between same items or different objects, and do not constitute any limitation on a quantity and an execution order, and the terms "first" and "second" do not mean being definitely different either. Besides, the terms "including" and "having" and any variations thereof in the description of the present application are intended to cover non-exclusion.

A related technology is brief description as blew.

A server includes an expansion card and a baseboard management controller (BMC). Each of the expansion card and the BMC includes firmware. The BMC may send instructions to the expansion card and receive returned data from the expansion card, for controlling the expansion card to implement corresponding functions.

While the firmware in the expansion card and the BMC are initially completed, for ensuring the accuracy of the firmware, the firmware in the expansion card and the BMC need to be executed for testing the accuracy of the firmware in the expansion card and/or the BMC. In that means, the BMC sends the instructions to the expansion card, and the expansion card response the instructions and generates returned data. Developers parses the returned data for determining the accuracy of the firmware in the expansion card and the BMC. For example, by parsing the returned data, it may be determine that whether the expansion card is able to generate the returned data correctly and in time based on the instructions sent by the BMC. When the expansion card is able to generate the returned data correctly and in time based on the instructions sent by the BMC, the firmware is correct. When the expansion card is unable to generate the returned data correctly and in time based on the instructions sent by the BMC, there is error existed in firmware. The firmware in the expansion card and the BMC needs to be fixed and debugged.

During developing the firmware in the expansion card and the BMC, a correctness of each firmware in the expansion card and the BMC is low, thus multiple tests are needed, which takes time and manpower. The developments of the firmware in the expansion card and the BMC are not synchronized with each other, a joint test is unable to be executed in time, and the developing process of each firmware in the expansion card and the BMC affects.

Besides, the developments of the firmware of the expansion card and the BMC belong to two different developing teams, the two developing teams cooperate with each other to execute the joint test. While executing the joint test, communication and collaborations between the two developing teams are not smooth, the joint test is unable to execute successfully, and data situation is unable to reflect clearly. Under this situation, the error part in the firmware is unable to be found. The manpower in the two developing teams is consumed, and a process of developing the firmware in the expansion card and the BMC is delayed. The firmware needs to be updated. After each update version of the firmware, the joint test needs to be required again, which increases a manpower consumption.

Thus, before testing the accuracy of the firmware of the expansion card and the BMC, it needs to be tested firstly that whether the BMC may communicate with the expansion card successfully.

Based on this, the present application provides a method of testing the expansion card, an electronic device, and a testing system, which test a communication situation of the expansion card independently, for improving a follow-up testing efficiency and an accuracy of the firmware.

Some terms are described firstly.

A configuration file is a computer file, which may configure parameters and initial setting for computer programs.

Firmware is a non-volatile storage medium embedded with program codes, such as a Read Only Memory (ROM) or a Flash.

Out-of-band manner means that the electronic device connects Universal Asynchronous Receiver/Transmitter (UART) serial ports of the expansion card using serial ports wires and completes an initial configuration of the serial ports in automatic programs, for achieving a communication between the electronic device and the expansion card.

In-band manner means that the electronic device communicates with the serial ports of the expansion card wireless with the help of tools provided by a manufacturer.

Referring to FIG. 1, FIG. 1 shows an embodiment of a testing system 100 of testing firmware of the expansion card of the present application. The testing system 100 includes an electronic device 10 and an expansion card 21. A communication manner between the expansion card 21 and the electronic device 10 may be an out-of-band manner or an in-band manner. The expansion card 21 is mounted on a device, such as a server, a computer, and a smartphone, and the like, for adding functions to a computer system of the device. The electronic device 10 is configured to execute a method of testing the expansion card 21 of the embodiment of the present application.

In some embodiments, the electronic device 10 may be the device with a display unit and abilities in data computing, processing and storing, such as the server, a computer, or a phone, and so on. The expansion card 21 supports a Serial Attached SCSI (SAS) protocol or a Peripheral Component Interconnect express (PCIe) protocol. The expansion card 21 is mounted in a to-be-tested device 20.

Referring to FIG. 2, FIG. 2 shows an embodiment of a method of testing the expansion card 21, used in the testing system 100 of testing the firmware of the expansion card 21. In detail, the method is used in the electronic device 10. The electronic device 10 may deploy Linux operation system. The method may include following steps.

In block S101, a configuration file is configured based on contents of instructions of a controller, which may be received by the expansion card 21, and contents of expected data corresponding to the instructions.

The contents of the instructions of the controller and the contents of the expected data corresponding to the instructions may be pro-stored in the electronic device 10, and also may be obtained in response to the input of an operator.

Figure 3:
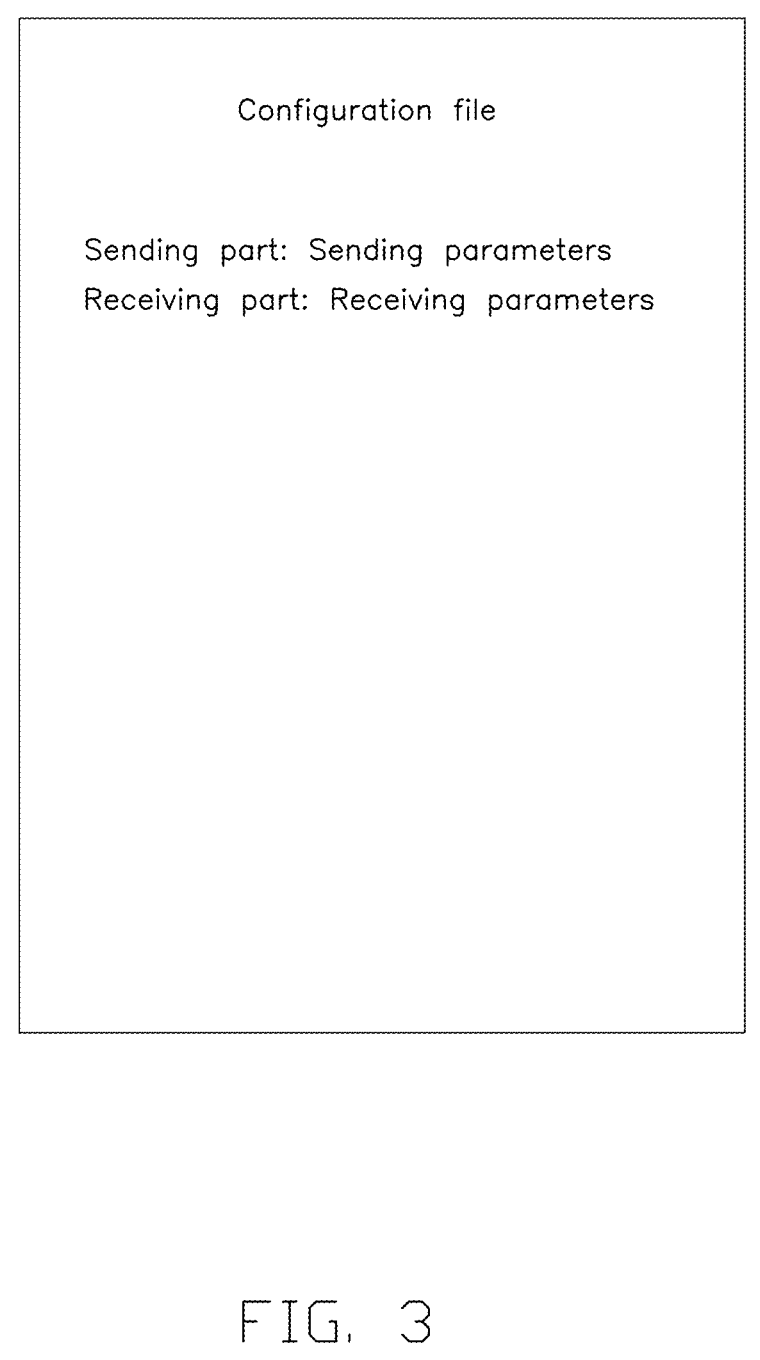

The controller is the BMC. The contents of the instructions of the controller includes contents of IICWR instruction. It is understood that, the expansion card 21 communicates with the BMC based on an Inter-Integrated Circuit (I2C) protocol, the firmware of the expansion card 21 supports a call of CLI instruction, and also support the IICWR instruction in the CLI instruction. Thus, the contents of the configuration file is configured based on the contents of the IICWR instruction. As shown in FIG. 3, the contents of the configuration file include a sending part. The sending part is configured to fill sending parameters. The sending parameters are configured to provide parameters to the IICWR instruction. In one embodiment, the sending parameters are filled in the configuration file based on the contents of the IICWR instruction.

The contents of the expected data are contents of returned data, which is possible to generated and returned after the expansion card responses to the instructions. The contents of the instructions may be combined with the contents of the expected data to configure the configuration file. As shown in FIG. 3, the contents of the configuration file include a receiving part. The receiving part is configured to fill receiving parameters. In one embodiment, the configuration file fills the sending parameters based on the contents of the expected data.

In block S102, testing instructions are generated based on the configuration file.

Each configuration file corresponds to one testing instruction. The number of the testing instructions is related to the number of configuration files. By adding or deleting the configuration files, the number of the testing instructions is increased or decreased. For example, N testing instructions are generated based on the N configuration files, when M of the configuration files are deleted from the N configuration files, the number of the testing instructions are decreased to N-M. Each testing instruction is configured to test whether the firmware of the expansion card 21 is correct. In one embodiment, the sending part of the configuration file may fill with the following contents.

```
I2C Address=B2
I2C Channel=1
Req:0:00: Checksum
......
Req:1~2:0700: FunctionID
```

"I2C Address" represents an address of a sending device which sends the testing instructions. "I2C Channel" represents a channel address of the sending device which sends the testing instructions. The sending device is the expansion card. "Req" represents a defined function of the testing instruction.

There are four columns in each "Req" part of the contents of the sending part. A first column of each "Req" part represents the part of the configuration file for filling the sending parameters into the testing instruction. A second column of each "Req" part represents an endianness. A third column of each "Req" part represents the sending parameters of each "Req" part being filled into the of the testing instruction (which is the written bytes). A fourth column of each "Req" part represents meaning of the sending parameters in each part "Req". In that means, the sending parameters further includes the parameters indicated by the third column of each "Req" part.

In one embodiment, the sending parameters are read, and are filled into a specified instruction format, and then a corresponding testing instruction is generated. The specified instruction format includes an IICWR instruction format. The IICWR instruction format is pre-stored in the electronic device 10. In one embodiment, the IICWR instruction format is IICWR <SlaveAddress(H)> <ChannelNumber (D)> <NumBytesToRead(D)> <WriteData(H) . . . >.

"<SlaveAddress(H)>" represents a device address. "<ChannelNumber(D)>" represents a channel address. "<NumBytesToRead(D)>" represents a number of the read bytes. "<WriteData(H) . . . >" represents written byte array.

The device address and the channel address are configured to specify an expansion card 21 for receiving the testing instructions. It is understood that, the firmware of each expansion card 21 stores the device address and the channel address, which is convenience for an external device to find the expansion card 21. The number of the read bytes is configured to specify the number of bytes of the returned data from the expansion card 21. The sending parameters (which is the sending parameters in the third column of the "Req" in the configuration file) are configured to specify the written byte array, for self-defining a function of the testing instruction.

Based on the above examples of the sending parameters of the sending part of the configuration file are filled into the specified instruction format, the generated testing instruction is IICWR B2 1 4 F8 07 00. The address of the expansion card is B2, the channel address is 1, the number of the read bytes is 4, the number of the returned data by responding to the testing instruction is 4 bytes.

In the example, "07" and "00" are two bytes in the byte array of the testing instruction. "F8" is a check code of the testing instruction ("F8" is computed based on the "07" and "00" by the electronic device 10). The check code is configured to check the sent data for preventing the data transmission error while communicating. The "07" and "00" represents that the function of the testing instruction is obtaining ID of the expansion card 21.

In block S103, the testing instructions are sent to the expansion card 21.

The testing instructions may be sent to the expansion card 21 in the out-of-band manner or the in-band manner. The specific communication manner is related to an initial configuration. When the initial configuration is the in-band manner, the testing instructions are sent in the in-band manner. When the initial configuration is the out-of-band manner, the testing instructions are sent in the out-of-band manner.

In block S104, returned data generated by the firmware of the expansion card 21 by responding to the testing instructions are received.

The expansion card 21 receives the testing instructions, and generates the returned data corresponding to the testing instruction by responding the testing instructions.

For example, when the testing instruction is "IICWR B2 1 4 F8 07 00". The returned data is "FE 00 01".

"FE" represents a check code bit, which is computed based on the returned data by the expansion card 21. "00" represents a state flag bit. The state flag bit is configured to indicate an accomplishing state of the testing instruction. In one embodiment, the contents of the state flag bit "00" may indicates success (the contents of the state flag bit "01" indicates fail). "01" of the returned data indicates the ID of the expansion card 21.

In block S105, determining whether the electronic device 10 communicates with the expansion card 21 successfully based on the returned data.

In one application scenario, the electronic device 10 configures the configuration file based on the contents of the instructions of the controller, which may be received by the expansion card 21, generates the testing instruction "IICWR B2 1 4 F8 07 00" based on the configuration file, and sends the testing instruction to the expansion card 21. Then, the electronic device 10 receives the returned data "FE 00 01" returned from the firmware of the expansion card 21 by responding to the testing instruction. The contents of the state flag bit "00" in the returned data "FE 00 01" indicates success, it determines that the electronic device 10 communicates with the expansion card 21 successfully, and it indicates that the electronic device 10 receives the returned data from the expansion card 21.

It is understood that, based on the above technical solution, the configuration file is configured based on the contents of the instructions of the controller, which may be received by the expansion card 21 and the contents of the expected data corresponding to the contents of the instructions, the testing instruction is generated based on the configuration file, the testing instruction is sent to the expansion card 21. Then, the returned data returned from the firmware of the expansion card 21 by responding to the testing instruction is received. Finally, whether the electronic device 10 communicates with the expansion card 21 successfully is determined based on the returned data. Without the BMC being jointed, the communication state of the expansion card 21 is independently tested, for improving testing efficiency and accuracy of the firmware of the expansion card 21.

It is understood that, the server generally includes the expansion card 21 under the SAS protocol or the PCIe protocol, for cooperating with a customization requirement of out-of-band monitoring of the BMC. The firmware of the expansion card 21 needs to define a specified number of the instruction formats according to the requirement of the BMC, which are used to return the data required by the BMC. In one embodiment, for testing the communication state of the firmware of the expansion card 21 in testing the firmware of the expansion 21, the testing instruction is used to simulate the universal IICWR instruction of the expansion card 21 itself. The specified instruction format is used to simulate the universal IICWR instruction format of the expansion card 21 itself, for simulating a command access of the expansion card 21 by external chip devices, such as the BMC. Situations of the joint test with instability, inaccuracy, and low efficiency are avoided. A customization development and a test of the expansion card 21 are integrated, and are able to be accomplished by a developer of the expansion card 21. Thus, the developing and testing of the expansion card 21 may be executed whenever and wherever possible, and undisturbed from outer factors. The self-defined I2C instructions may be quickly verified in order. A developing schedule is greatly improved, a difficulty in debugging is decreased, and a process of debugging is simplified.

It is understood that, only the developer related to the expansion card 21 is involved for testing the expansion card 21, there is no need of the developing of the firmware of the BMC being accomplished, the developer related to the BMC is not involved. By replacing the joint test, the testing of the expansion card 21 is automatically accomplished without being limited to the development process and the manpower of the BMC.

In some embodiments, the block S104 further includes following steps.

The returned data is parsed based on the receiving parameters of the configuration file, and a log file is generated and stored based on the parsed returned data after parsing the returned data.

As shown in FIG. 3, the receiving part of the configuration file is configured to fill the receiving parameters. The receiving parameters are configured to pars with the returned data.

In one example, the following contents are filled in the receiving part of the configuration file.

```
Resq:0:00: Checksum
Resq:1:00: completion code
......
Resq:2:00: Expander ID
```

There are four columns in each "Resq" part of the contents of the receiving part of the configuration file. A first column in each "Resq" part represents a part of the configuration file being parsed with the returned data. A second column in each "Resq" part represents byte array. A third column in each "Resq" part represents the receiving parameters being parsed with the returned data. A fourth column in each "Resq" part represents a specific meaning of the receiving parameters in each "Resq" part (which is an explanation of the receiving parameters). It is understood that, the receiving parameters includes the parameters indicated by the third column of each "Resq" part.

The returned data and the receiving parameters are parsed according to a byte order. When being parsed successfully, positions of the returned data and the receiving parameters are corresponded to each other, and each byte in the returned data corresponds to one specific meaning in a corresponding position of the receiving parameters. When being parsed unsuccessfully, positions of the returned data and the receiving parameters are not corresponded to each other, and/or at least one byte in the returned data does not correspond to one specific meaning in a corresponding position of the receiving parameters.

For example, the receiving parameters is 00 00 00, the returned data is FE 00 01. The positions of the returned data and the receiving parameters are corresponded to each other, it is determined that each byte in the returned data corresponds to one specific meaning in a corresponding position of the receiving parameters.

While parsing the returned data, the log file is generated based on the returned data filled into the receiving part (the parsed returned data), the testing instruction, and the parameters indicated by the third column of the Req.

In one example, the contents of the log file are shown as below.

```
>>>>Reading:[0x0700 Get Expander ID.txt]
Req[0] Checksum :FE
Req[1~2] Function ID :0700
CMD>./scrtnycli.x86-64-I 4 cli iicwr B2 1 4 FE 07 00
Resq[0] Checksum :FE
Resq[1] completion Code :00 (Success)
Resq[2] Expander ID :01
```

The state flag completion Code in the log file indicates success, which represents the electronic device 10 communicates with the expansion card 21 successfully. It is understood that, the log file generated based on the parsed returned data may collect and store testing result at one time, an outputted result is more direct and more accurate.

In some embodiments, the testing method further includes the following steps.

In block S201, it is determined that an automatic program executes correctly when the returned data is parsed successfully, and the procedure goes to the block S301.

It is understood that, when the returned data are parsed successfully, the firmware of the expansion card 21 is able to response the testing instruction, the contents of the parsed returned data are further parsed to determine whether the electronic device 10 communicates with the expansion card 21 successfully.

In block S202, an abnormal warning is triggered when the returned data is parsed unsuccessful.

When the returned data is parsed unsuccessful, the expansion card 21 is unable to response the testing instruction, there is problems in the automatic program which causes the automatic program not to execute properly, the abnormal warning is triggered for prompting the developer to repair manually.

In some embodiments, the block S105 includes the following steps.

In block S301, confirming contents of the state flag in the log file.

In block S302, the electronic device 10 communicates with the expansion card 21 successfully when the contents of the state flag in the log file indicates success.

In block S303, the abnormal warning is triggered when the contents of the state flag in the log file indicates fail.

In the above examples, the contents of the log file includes: Resq[1] completion Code :00 (Success). The parameters in the state flag completion Code is 00, which indicates success and represents the electronic device 10 communicates with the expansion card 21 successfully.

It is understood that, after being parsed successfully, the state flag in the log file is also used to determine whether an aim of the testing instruction achieves. When the contents of the state flag indicates success, the aim of the testing instruction achieves, the electronic device 10 communicates with the expansion card 21 successfully. When the contents of the state flag indicates fail, the aim of the testing instruction does not achieve, the electronic device 10 communicates with the expansion card 21 fail, and the abnormal warning is triggered. The developer involves to analysis the abnormal in the expansion card 21.

It is understood that, the process of analyzing the log file may be automatically executed by the electronic device 10 or be executed by the developer.

In some embodiments, after the testing instructions are generated based on the configuration file, the testing method further includes the following steps.

In block S401, determining whether the number of the testing instructions is larger than a specified number.

In block S402, the testing instructions are sent to the expansion card 21 when the number of the testing instructions is less than the specified number.

In block S403, the procedure ends when the number of the testing instructions is larger than or equal to the specified number.

It is understood that, a threshold of the number of the testing instructions may be pre-defined, for preventing from an infinite test. The threshold may be equal to the specified number. The specified number may be set according to an actual situation. When the number of the testing instructions is less than the specified number, it represents that the testing process may be continues. When the number of the testing instructions is larger than or equal to the specified number, the procedure ends.

In some embodiments, before configuring the configuration file, the testing method further includes determining the transmission manner of the testing instructions and the returned data is the out-of-band manner or the in-band manner and obtaining the address of the expansion card 21 and the channel address, thus the configuration file is configured based on the address of the expansion card 21 and the channel address. In that means, before configuring the configuration file, an initial setup is executed. The process of the initial setup includes selecting a transmission manner and obtaining the address for specifying the specified expansion card 21.

Figure 4:
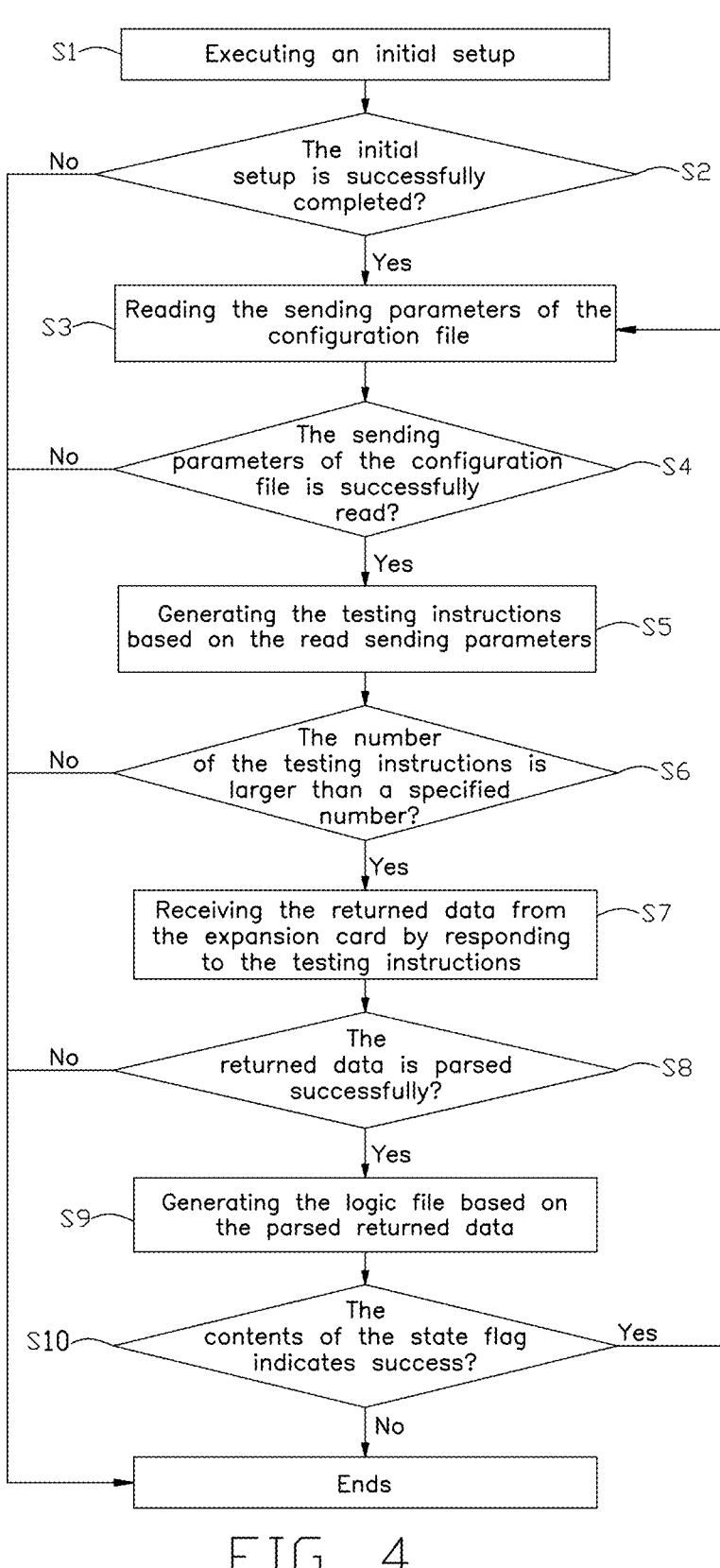
FIG. 4 is a flowchart illustrating a second embodiment of a method of testing an expansion card according to the present application.

An application scenario of the electronic device 10 for testing the firmware of the expansion card 21 will be described as blew, for illustrating parts of the foregoing embodiments. As shown in FIG. 4, the electronic device 10 executes the following steps.

In block S1, the initial setup is executed, the configuration file is configured based on the contents of the instructions of the controller, which may be received by the expansion card 21, and the contents of the expected data corresponding to the contents of the instructions.

Firstly, the initial setup at least includes selecting the electronic device 10 to communicate with the expansion card 21 in the out-of-band manner and obtains the address of the expansion card 21 and the channel address. Then, the configuration file is configured based on the contents of the instructions of the controller, which may be received by the expansion card 21, and the contents of the expected data corresponding to the contents of the instructions.

In block S2, determining whether the initial setup is successfully completed. When the initial setup is successfully completed, the procedure goes to the block S3. Otherwise, the procedure ends.

In block S3, the sending parameters of the configuration file are read.

In block S4, determining whether the sending parameters of the configuration file are successfully read. When the sending parameters are successfully read, the procedure goes to the block S5. Otherwise, the procedure ends.

In block S5, the testing instructions are generated based on the read sending parameters.

In block S6, determining whether the number of the testing instructions is larger than the specified number. When the number of the testing instructions is less than the specified number, the procedure goes to the block S7. Otherwise, the procedure ends.

In block S7, the returned data returned from the expansion card 21 by responding to the testing instructions is received.

In block S8, determining whether the returned data is parsed successfully. When the returned data is parsed successfully, the procedure goes to the block S9. Otherwise, the procedure ends.

In block S9, the log file is generated based on the parsed returned data.

In block S10, determining whether contents of the state flag in the log file indicates success. When the contents of the state flag in the log file indicates success, the electronic device 10 communicates with the expansion card 21 successfully, the procedure returns to the block S3. Otherwise, the abnormal warning is generated, and the procedure ends.

Figure 5:
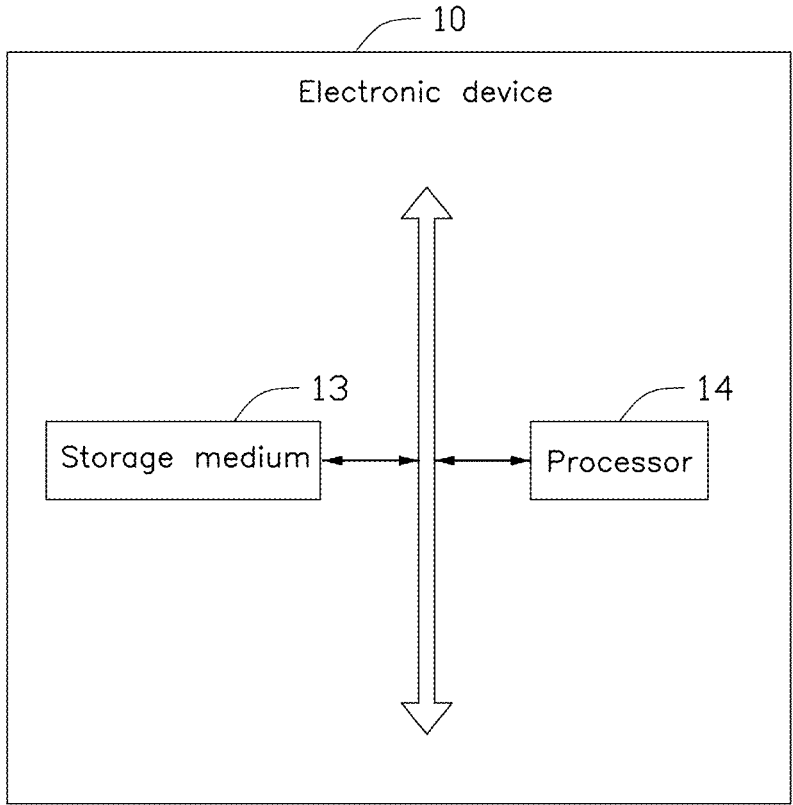
FIG. 5 is a diagram illustrating of an electronic device according to the present application.

Referring to FIG. 5, FIG. 5 is a diagram of the electronic device 10 of an embodiment of the present application. In one embodiment, the electronic device 10 includes a storage medium 13 and at least one processor 14. Those of ordinary skills in the related art should understand that, the structure as shown in FIG. 4 does not constitute a limitation one the electronic device of the present application. The electronic device 10 may include components more or less than those shown in the diagram, a combination of some components, or different component arrangements.

As an optional implementation, the electronic device 10 may include a terminal device that may be automatically perform numerical calculation and/or information processing according to preset or stored instructions, and hardware of the device may include a microprocessor, an Application Specific Integrated Circuit (ASIC), a Field-programmable Gate Array (FPGA), a Digital Signal Processor (DSP), an embedded device, and the like, but not being limited. As an optional implementation, the storage medium 13 may include a Read-Only Memory (ROM), a Random Access Memory (RAM), a Programmable Read-Only Memory (PROM), or any other computer-readable media that may be used to carry or store data.

As an optional implementation, the at least one processor 14 may include an integrated circuit, for example, may include a single packaged integrated circuit, or may include multiple integrated circuits with the same function or different functions packaged, including one or more central processing units (CPUs), microprocessors, digital processing chips, graphics processors, and various control chips. The at least one processor 14 is the control unit of the electronic device 10, which executes various functions and processes data of the electronic device 10 by running or executing programs or modules stored in the storage medium 13, and invoking data stored in the storage medium 13. The storage medium 13 stores program code, and the at least one processor 14 may call the program code stored in the storage medium 13 to perform the foregoing method of testing the expansion card 21.

The present application also provides a testing system 100. The testing system 100 includes the electronic device 10 and the expansion card 21. The electronic device 10 is configured to configure the configuration file based on the contents of the instructions of the controller, which may be received by the expansion card 21, and contents of expected data corresponding to the contents of the instructions, generate testing instructions based on the configuration file, send the testing instructions to the expansion card 21, receive the returned data returned from the expansion card 21 by responding to the testing instructions, and determine whether the electronic device 10 communicates with the expansion card 21 successfully based on the returned data.

In some embodiments, the electronic device 10 is also configured to read the sending parameters of the configuration file and fill the sending parameters into a specified format, and generate the testing instructions.

In some embodiments, the electronic device is also configured to pars the returned data based on the receiving parameters of the configuration file. When the returned data is parsed successfully, a log file is generated based on the parsed returned data. The contents of the state flag in the log file is determined. When the contents of the state flag in the log file indicates success, the electronic device 10 communicates with the expansion card 21 successfully. When the contents of the state flag in the log file indicates fail, the abnormal warning is triggered. When the returned data is parsed unsuccessfully, the abnormal warning is triggered.

In some embodiments, the electronic device 10 is also configured to determine whether the number of the testing instructions is larger than the specified number. When it determines that the number of the test instructions is less than the specified number, the test instructions are sent to the expansion card 21. When it determines that the number of the test instructions is larger than or equal to the specified number, the test is stopped.

In some embodiments, the electronic device 10 is also configured to obtain the address of the expansion card 21 and the channel address of the expansion card 21, for obtaining the contents of the instructions of the controller, which may be received by the expansion card 21.

The present application also provides a storage medium. The storage medium stores computer programs. When executing the computer programs in the electronic device 10, the electronic device is capable of implementing the foregoing method of testing the expansion card.

Persons of ordinary skill in the art may be aware that the exemplary units and algorithm steps described in the embodiments disclosed herein may be implemented by electronic hardware, or a combination of computer software and electronic hardware. Whether those functions are executed by hardware or software depends on the particular application and the design constraint conditions of the technical solutions. It may be clearly understood by persons skilled in the art that, for the purpose of convenient and brief description, for the specific working process of the foregoing system, device, and unit, reference may be made to the corresponding process in the method embodiments, and details will not be described herein again.

Those skilled in the art will recognize that the above described embodiments are only intended to illustrate the invention and are not intended to limit the invention, and numerous possible modifications and variations within the spirit of the invention will fall within the scope of the invention.

What is claimed is:

1. A method of testing an expansion card, applied in an electronic device; the electronic device comprises a storage medium and a processor; the storage medium stores computer programs; and the processor executes the computer programs to implement following processes:
   acquiring contents of instructions of a controller corresponding to the expansion card;

acquiring contents of expected data corresponding to the contents of the instructions in response to the expansion card receiving the contents of instructions;
   configuring at least one configuration file based on the contents of instructions and the contents of expected data; wherein the controller is a baseboard management controller;
   generating testing instructions based on the at least one configuration file;
   sending the testing instructions to the expansion card;
   receiving returned data from firmware of the expansion card, which is generated while executing the testing instructions;
   determining whether the electronic device communicates with the expansion card successfully based on the returned data;
   parsing the returned data based on receiving parameters of the at least one configuration file; and
   generating a log file based on the parsed returned data in response to the returned data been parsed successfully;
   wherein determining whether the electronic device communicates with the expansion card successfully based on the returned data comprises:
   reading contents of a state flag in the log file, wherein
   in a case that the contents of the state flag indicate that the electronic device communicates with the expansion card successfully, determining the electronic device is communicating with the expansion card; and
   in case that the contents of the state flag indicate that the electronic device fails to communicate with the expansion card, triggering an abnormal warning.

2. The method of claim 1, wherein generating the testing instructions based on the at least one configuration file comprises:
   reading sending parameters in the at least one configuration file; and
   filling the sending parameters in a specified format and generating the testing instructions.

3. The method of claim 1, after parsing the returned data based on the receiving parameters of the at least one configuration file, the method further comprising:
   in a case that the returned data is parsed unsuccessfully, triggering the abnormal warning.

4. The method of claim 1, after generating the testing instructions based on the at least one configuration file, the method further comprising:
   determining whether a number of the testing instructions is larger than or equal to a specified number, wherein
   in a case that the number of the testing instructions is less than the specified number, sending the testing instructions to the expansion card; and
   in a case that the number of the testing instructions is larger than or equal to the specified number, stopping testing.

5. The method of claim 1, before configuring the at least one configuration file based on the contents of the instructions, and contents of expected data, the method further comprising:
   obtaining a device address of the expansion card and a channel address;
   wherein the contents of the instructions is acquired based on the device address of the expansion card and the channel address.

6. The method of claim 1, wherein a transmission manner of the testing instructions from the electronic device to the expansion card and the returned data from the expansion card to the electronic device comprises an out-of-band manner, or an in-band manner.

7. The method of claim 1, wherein the acquired number of the testing instructions is related to the number of at least one configuration file, each testing instruction is generated based on one configuration file.

8. An electronic device comprises:
a processor, configured to execute computer programs;
a non-transitory computer readable storage medium, configured to store the computer programs; the computer programs are executed by the processor to implement following instructions:
acquiring contents of instructions of a controller corresponding to an expansion card;
acquiring contents of expected data corresponding to the contents of the instructions in response to the expansion card receiving the contents of instructions;
configuring at least one configuration file based on the contents of instructions of a controller and contents of expected data; wherein the controller is a baseboard management controller;
generating testing instructions based on the at least one configuration file;
sending the testing instructions to the expansion card;
receiving returned data from firmware of the expansion card, which is generated while executing the testing instructions; and
determining whether the electronic device communicates with the expansion card successfully based on the returned data;
parsing the returned data based on receiving parameters of the at least one configuration file; and
generating a log file based on the parsed returned data in response to the returned data been parsed successfully;
reading contents of a state flag in the log file; wherein
in a case that the contents of the state flag indicate the electronic device communicates with the expansion card successfully, determining the electronic device communicates with the expansion card successfully; and
in a case that the contents of the state flag indicate the electronic device fails to communicate with the expansion card, triggering an abnormal warning.

9. The electronic device of claim 8, wherein the processor further:
reading sending parameters in the at least one configuration file; and
filling the sending parameters in a specified format and generating the testing instructions.

10. The electronic device of claim 8, wherein the processor further:
in a case that the returned data is parsed unsuccessfully, triggering the abnormal warning.

11. The electronic device of claim 8, wherein the processor further:
determining whether a number of the testing instructions is larger than or equal to a specified number, wherein
in a case that the number of the testing instructions is less than the specified number, sending the testing instructions to the expansion card; and
in a case that the number of the testing instructions is larger than or equal to the specified number, stopping testing.

12. The electronic device of claim 8, wherein the processor further:
obtaining a device address of the expansion card and a channel address;
wherein the contents of the instructions is acquired based on the device address of the expansion card and the channel address.

13. A testing system comprises an electronic device and an expansion card; wherein the electronic device is configured to:
acquire contents of instructions of a controller corresponding to the expansion card;
acquire contents of expected data corresponding to the contents of the instructions in response to the expansion card receiving the contents of instructions;
configure at least one configuration file based on the contents of instructions of a controller, and contents of expected data; wherein the controller is a baseboard management controller;
generate testing instructions based on the at least one configuration file;
send the testing instructions to the expansion card;
receive returned data from firmware of the expansion card, which is generated while executing the testing instructions; and
determines whether the electronic device communicates with the expansion card successfully based on the returned data;
wherein the electronic device is also configured to parse the returned data based on receiving parameters of the at least one configuration file, and generate a log file based on the parsed returned data when the returned data is parsed successfully; the electronic device is also configured to read contents of a state flag in the at least one configuration file; in a case that the contents of the state flag indicate that the electronic device communicates with the expansion card successfully, the electronic device communicates with the expansion card successfully; in case that the contents of the state flag indicate that the electronic device fails to communicate with the expansion card, an abnormal warning is generated.

14. The testing system of claim 13, wherein the electronic device is also configured to read sending parameters in the at least one configuration file, and fill the sending parameters in a specified format and generating the testing instructions.

15. The testing system of claim 13, wherein in a case that the returned data is parsed unsuccessfully, the abnormal warning is triggered.

16. The testing system of claim 13, wherein the electronic device is also configured to determine whether a number of the testing instructions is larger than or equal to a specified number; in a case that the number of the testing instructions is less than the specified number, the testing instructions are sent to the expansion card; in a case that the number of the testing instructions is larger than or equal to the specified number, stopping testing.

17. The testing system of claim 13, wherein the electronic device is also configured to obtain a device address of the expansion card and a channel address; wherein the contents of the instructions is acquired based on the device address of the expansion card and the channel address.

* * * * *